(12) United States Patent
Murakami (10) Patent No.: US 8,235,187 B2
(45) Date of Patent: Aug. 7, 2012

(54) HYDRAULIC SHOCK ABSORBER

(75) Inventor: Yosuke Murakami, Haga-Gun (JP)

(73) Assignee: Showa Corporation, Saitama (JP)

( * ) Notice: Subject to any disclaimer, the term of this patent is extended or adjusted under 35 U.S.C. 154(b) by 1171 days.

(21) Appl. No.: 12/043,919

(22) Filed: Mar. 6, 2008

(65) Prior Publication Data

US 2009/0084644 A1    Apr. 2, 2009

(30) Foreign Application Priority Data

Sep. 28, 2007   (JP) ................................ 2007-253361

(51) Int. Cl.
*F16F 9/48* (2006.01)

(52) U.S. Cl. ....................................... 188/285; 188/289

(58) Field of Classification Search .................. 188/278, 188/282.6, 282.8, 282.9, 285, 289, 309, 310, 188/316, 317, 319.1, 319.2, 280, 281, 282.1, 188/282.4, 282.5
See application file for complete search history.

(56) References Cited

U.S. PATENT DOCUMENTS

| | | | | |
|---|---|---|---|---|
| 1,790,310 A * | 1/1931 | Kilgore | ........................ | 188/278 |
| 2,615,534 A * | 10/1952 | Blake | ........................... | 188/316 |
| 4,305,486 A * | 12/1981 | Cowan | ....................... | 188/282.1 |
| 4,693,454 A * | 9/1987 | Tsuchiya et al. | .............. | 267/226 |
| 5,133,434 A * | 7/1992 | Kikushima et al. | ......... | 188/282.1 |
| 5,433,302 A * | 7/1995 | Heide | ............................ | 188/378 |
| 5,507,371 A * | 4/1996 | Takahashi | .................. | 188/282.5 |
| 5,566,796 A * | 10/1996 | De Kock | ..................... | 188/282.1 |
| 5,944,283 A * | 8/1999 | Carter, Jr. | ............... | 244/104 FP |
| 6,360,857 B1 * | 3/2002 | Fox et al. | ...................... | 188/281 |
| 6,840,357 B2 * | 1/2005 | Toiyama et al. | ........... | 188/319.2 |
| 6,899,208 B2 * | 5/2005 | VanValkenburgh et al. | .. | 188/309 |
| 6,986,414 B2 * | 1/2006 | Honig et al. | ............... | 188/282.9 |
| 7,270,222 B1 * | 9/2007 | Aymar | ......................... | 188/285 |
| 7,913,823 B2 * | 3/2011 | Murakami | .................. | 188/314 |
| 2003/0173170 A1* | 9/2003 | Nagai | ............................ | 188/316 |
| 2005/0145456 A1* | 7/2005 | Tomonaga et al. | ........... | 188/297 |
| 2008/0023281 A1* | 1/2008 | Murakami | ............... | 188/322.22 |
| 2008/0230335 A1* | 9/2008 | Furuya et al. | ................ | 188/315 |
| 2009/0014264 A1* | 1/2009 | Yoshimoto | ..................... | 188/314 |
| 2009/0266656 A1* | 10/2009 | Murakami | ................. | 188/266.1 |
| 2009/0266657 A1* | 10/2009 | Murakami | ................. | 188/266.1 |

FOREIGN PATENT DOCUMENTS

| | | | |
|---|---|---|---|
| JP | 02107840 A | * | 4/1990 |
| JP | 2004-251430 | | 9/2004 |
| JP | 2007-225066 | | 9/2007 |

OTHER PUBLICATIONS

English-language machine translation of JP 2004-251430 obtained from www.ipdl.inpit.go.jp.*

* cited by examiner

*Primary Examiner* — Bradley King
*Assistant Examiner* — Nicholas J Lane
(74) *Attorney, Agent, or Firm* — Babcock IP, PLLC (57) ABSTRACT

In a hydraulic shock absorber structured such that a vehicle body side tube and an axle side tube are slidably fitted, and a plurality of adjusting portions are provided in a cap sealed to an upper end opening portion of the vehicle body side tube, a plurality of adjusting portions are arranged side by side in a plan view of the cap.

6 Claims, 9 Drawing Sheets

HYDRAULIC SHOCK ABSORBER

BACKGROUND OF THE INVENTION

1. Field of the Invention

The present invention relates to a hydraulic shock absorber of a front fork and the like. More specifically, the invention relates to a hydraulic shock absorber with a reduced adjusting portion height and or a streamlined appearance.

2. Description of the Related Art

In a front fork (a hydraulic shock absorber) for a motor cycle, as described in Japanese Patent Application Laid-Open (JP-A) No. 2007-225066 (patent document 1), a plurality of adjusting portions for adjusting a damping force are provided in a cap which is structured such that a vehicle body side tube and an axle side tube are slidably fitted, and is sealed to an upper end opening portion of the vehicle body side tube.

In the conventional front fork, a plurality of adjusting portions are coaxially arranged in a plan view of the cap. Accordingly, it is necessary that the adjusting portions are provided in such a manner that operation portions thereof are shifted from each other in an axial direction (a height direction), it is unavoidable to make a height of the adjusting portions in a center side higher, thereby adversely affecting an interference with a vehicle body side such as a handle, a cowl and the like. Further, a design of a top surface of the cap tends to get into a rut.

SUMMARY OF THE INVENTION

An object of the present invention is to provide a hydraulic shock absorber provided with a plurality of adjusting portions in a cap of a vehicle body side tube, in which a height is restricted and the outer appearance becomes streamlined.

The present invention relates to a hydraulic shock absorber structured such that a vehicle body side tube and an axle side tube are slidably fitted, and a plurality of adjusting portions are provided in a cap sealed to an upper end opening portion of said vehicle body side tube. The plurality of adjusting portions are arranged side by side in a plan view of said cap.

Furthermore, the present invention relates to a hydraulic shock absorber comprising: an axle side inner tube slidably inserted to a vehicle body side outer tube; a partition wall member provided in an inner periphery of said inner tube, and a working fluid chamber and an oil reservoir chamber respectively comparted in a lower side and an upper side of said partition wall member; a piston support member attached to said outer tube side being inserted into said working fluid chamber through said partition wall member, and a piston sliding within said working fluid chamber provided in a leading end portion of said piston support member; and a plurality of adjusting portions being provided in a cap sealed to an upper end opening portion of said outer tube. The plurality of adjusting portions arranged side by side in a plan view of said cap.

Furthermore, the present invention relates to a hydraulic shock absorber comprising: an axle side inner tube slidably inserted to a vehicle body side outer tube; a partition wall member provided in an inner periphery of said inner tube, and a working fluid chamber and an oil reservoir chamber respectively comparted in a lower side and an upper side of said partition wall member; a hollow piston rod attached to said outer tube side inserted into said working fluid chamber through said partition wall member, and a piston sliding within said working fluid chamber provided in a leading end portion of said piston rod; a working fluid chamber of said inner tube comparted into a piston rod side oil chamber and a piston side oil chamber by the piston, the two oil chambers capable of being communicated by a compression side flow path and an expansion side flow path provided in the piston, and a compression side damping valve and an expansion side damping valve respectively provided in outlets of the two flow paths; a hollow portion of the piston rod provided with a bypass path communicating a piston rod side oil chamber with a piston side oil chamber, and said bypass path provided with a needle valve; and a cap sealed to an upper end opening portion of said outer tube provided with a first adjusting portion moving the needle valve and adjusting a damping force caused by a passage resistance of the bypass path, and a second adjusting portion adjusting a deflection deformation of a compression side damping valve by adjusting a set load of a spring energizing the compression side damping valve in a closing direction. The first and second adjusting portions arranged side by side in a plan view of said cap.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

A front fork (a hydraulic shock absorber) 10 is constituted by an inverted type front fork in which an outer tube 11 is arranged in a vehicle body side, and a inner tube 12 is arranged in a wheel side. As shown in FIGS. 1 to 4, the inner tube 12 is slidably inserted to an inner portion of the outer tube 11 via a guide bush 11A fixed to an inner periphery of a lower end opening portion of the outer tube 11 and a guide bush 12A fixed to an outer periphery of an upper end opening portion of the inner tube 12. Reference symbol 11B denotes an oil seal, and reference symbol 11C denotes a dust seal. A cap 13 is screwed in a liquid tight manner to the upper end opening portion of the outer tube 11 so as to be sealed, and a vehicle body side attaching member is provided in an outer periphery of the outer tube 11. An axle bracket 15 is inserted and attached in a liquid tight manner to the lower end opening portion of the inner tube 12 so as to be screwed and construct a bottom portion of the inner tube 12, and an axle attaching hole 16 is provided in the axle bracket 15.

The front fork 10 comparts an annular oil chamber 17 that is defined by the inner periphery of the outer tube 11, the outer periphery of the inner tube 12, and two guide bushes 11A and 12A mentioned above.

The front fork 10 is provided with a closed-end cup shaped partition wall member 19 in the upper end side inner periphery of the inner tube 12 in a liquid tight manner via an O-ring or the like that comparts a working fluid chamber 21 in a lower portion than a rod guide portion 19A in a bottom portion of the partition wall member 19, and comparts an oil reservoir chamber 22 in an upper portion. A lower side region in the oil reservoir chamber 22 corresponds to an oil chamber 22A, and an upper side region corresponds to an air chamber 22B. The guide bush 12A provided in an outer periphery of an upper end portion protruding from the inner tube 12 of the partition wall member 19 comes into slidable contact with the inner periphery of the outer tube 11.

The front fork 10 is structured such that a piston rod 23 attached to the outer tube 11 is slidably inserted to the rod guide portion 19A of the partition wall member 19. Specifically, a hollow piston rod 23 is screwed into an attaching collar 24 screwed to a lower end portion of a center portion of the cap 13, and is fixed by a lock nut 24A.

The front fork 10 is structured such that a piston 26 coming into slidable contact with the inner periphery of the inner tube 12 is fixed to a piston bolt 25 screwed to a leading end portion of the piston rod 23 inserted to the inner tube 12 from the rod guide portion 19A of the partition wall member 19, and the oil chamber 21 is comparted into a piston rod side oil chamber 21A in which the piston rod 23 is accommodated, and a piston side oil chamber 21B in which the piston rod 23 is not accommodated. The piston 26 is fixed by a piston nut 27.

In the front fork 10, the annular oil chamber 17 is always communicated with the piston rod side oil chamber 21A via an oil hole 28 provided in the inner tube 12.

The front fork 10 is structured such that an upper spring receiver 31 is attached to a side of a lower end surface facing to the piston side oil chamber 21B of the piston 26, a lower spring receiver 32 is arranged in a bottom portion of the inner tube 12 formed by the axle bracket 15, and a main suspension spring 33 is interposed between the upper spring receiver 31 and the lower spring receiver 32. The entire main suspension spring 33 is dipped into the piston side oil chamber 21B. The front fork 10 absorbs an impact force applied from a road surface at a time when a vehicle travels, on the basis of a stretching vibration of the main suspension spring 33. At this time, a spring load adjusting apparatus 35 moves up and down the lower spring receiver 32, and can adjust a spring load of the main suspension spring 33.

Figure 1:
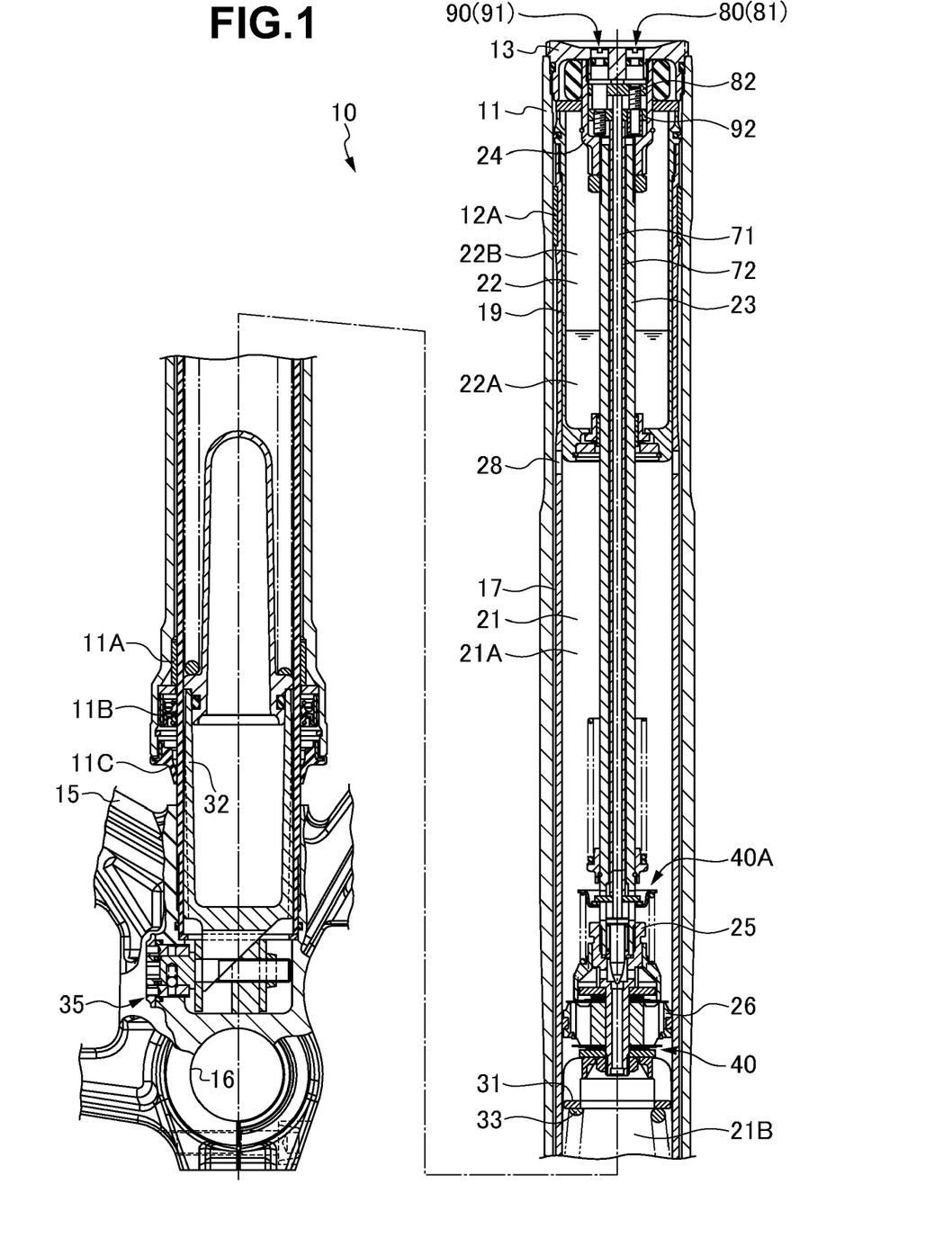
FIG. 1 is a general cross sectional view showing a hydraulic shock absorber.
Figure 2:
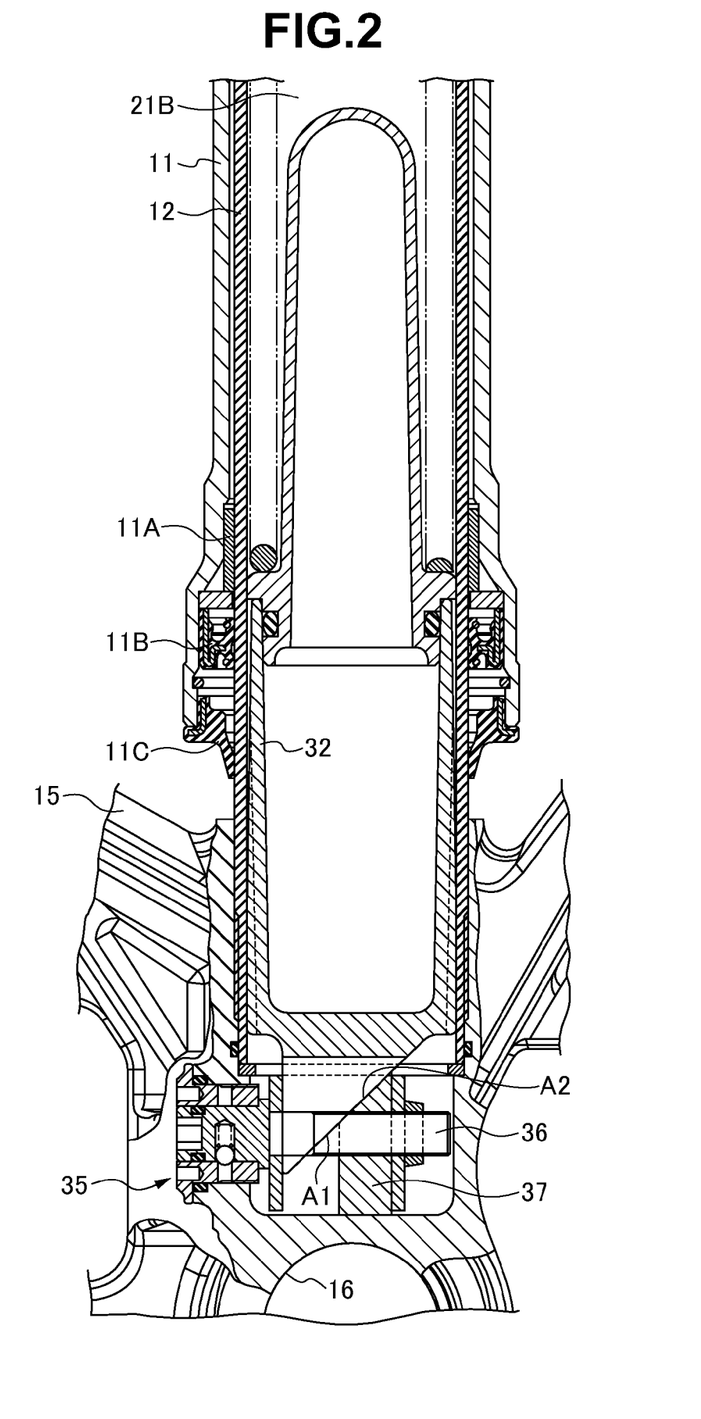
FIG. 2 is a cross sectional view of a lower portion in FIG. 1.

The spring load adjusting apparatus 35 is provided with an adjust bolt 36 facing to an outer portion at a position (in a side of the axle attaching hole 16) deflecting from the axle attaching hole 16 of the axle bracket 15 constructing the bottom portion of the inner tube 12, in the bottom portion, as shown in FIG. 2. A slider 37 provided in an inner side bottom portion (a surface facing to the lower end portion of the lower spring receiver 32) of the axle bracket 15 can be linearly moved in a direction (an axial direction of the adjust bolt 36) which is orthogonal to a center axis of the inner tube 12, on the basis of a rotating force of the adjust bolt 36. A spring load of the suspension spring 33 is adjusted by mounting a lower inclined surface A1 of the lower spring receiver 32 to an upper inclined surface A2 of the slider 37, and moving up and down the lower spring receiver 32 on the basis of a rotation of the adjust bolt 36.

Figure 3:
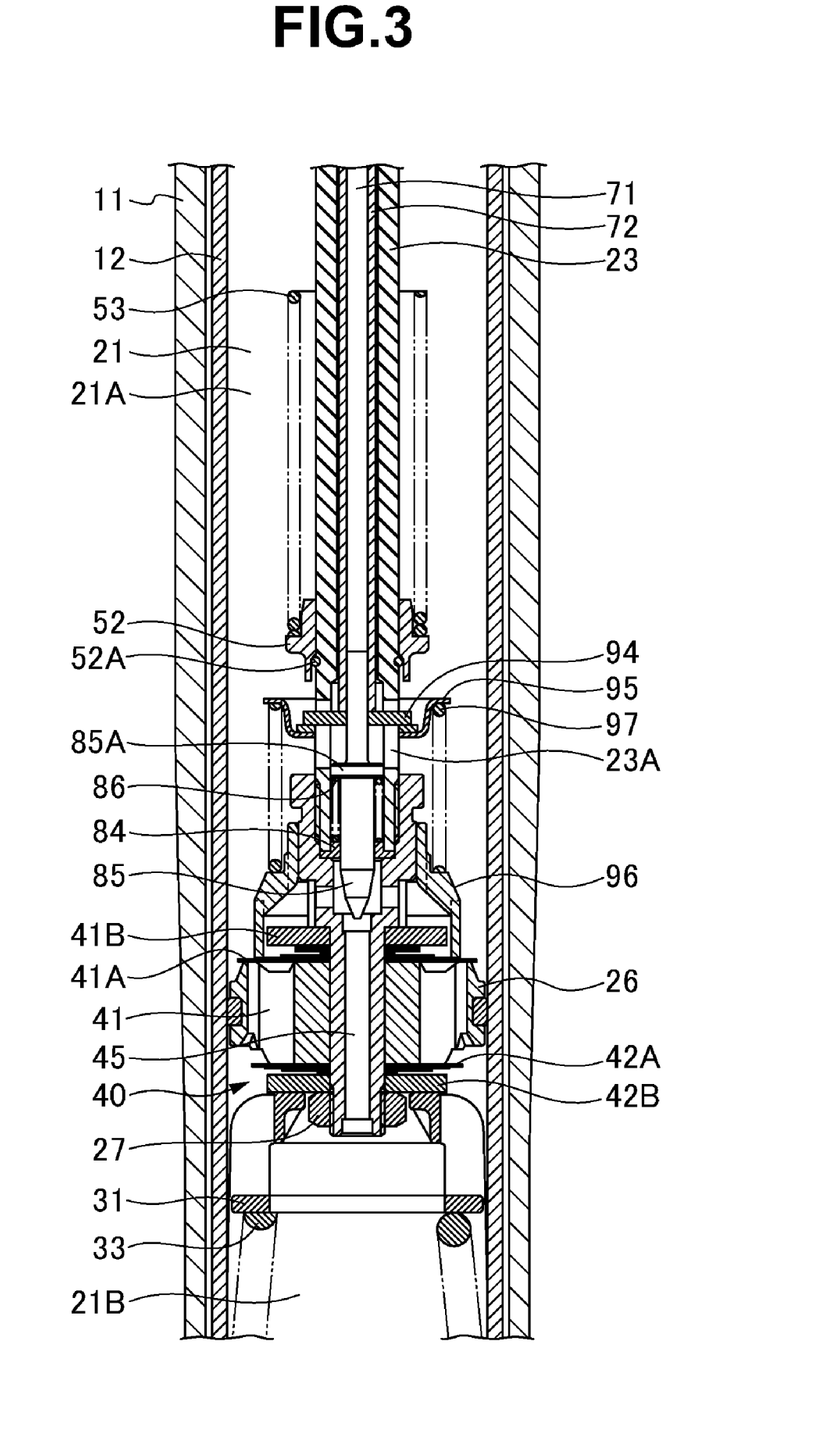
FIG. 3 is a cross sectional view of an intermediate portion in FIG. 1.
Figure 4:
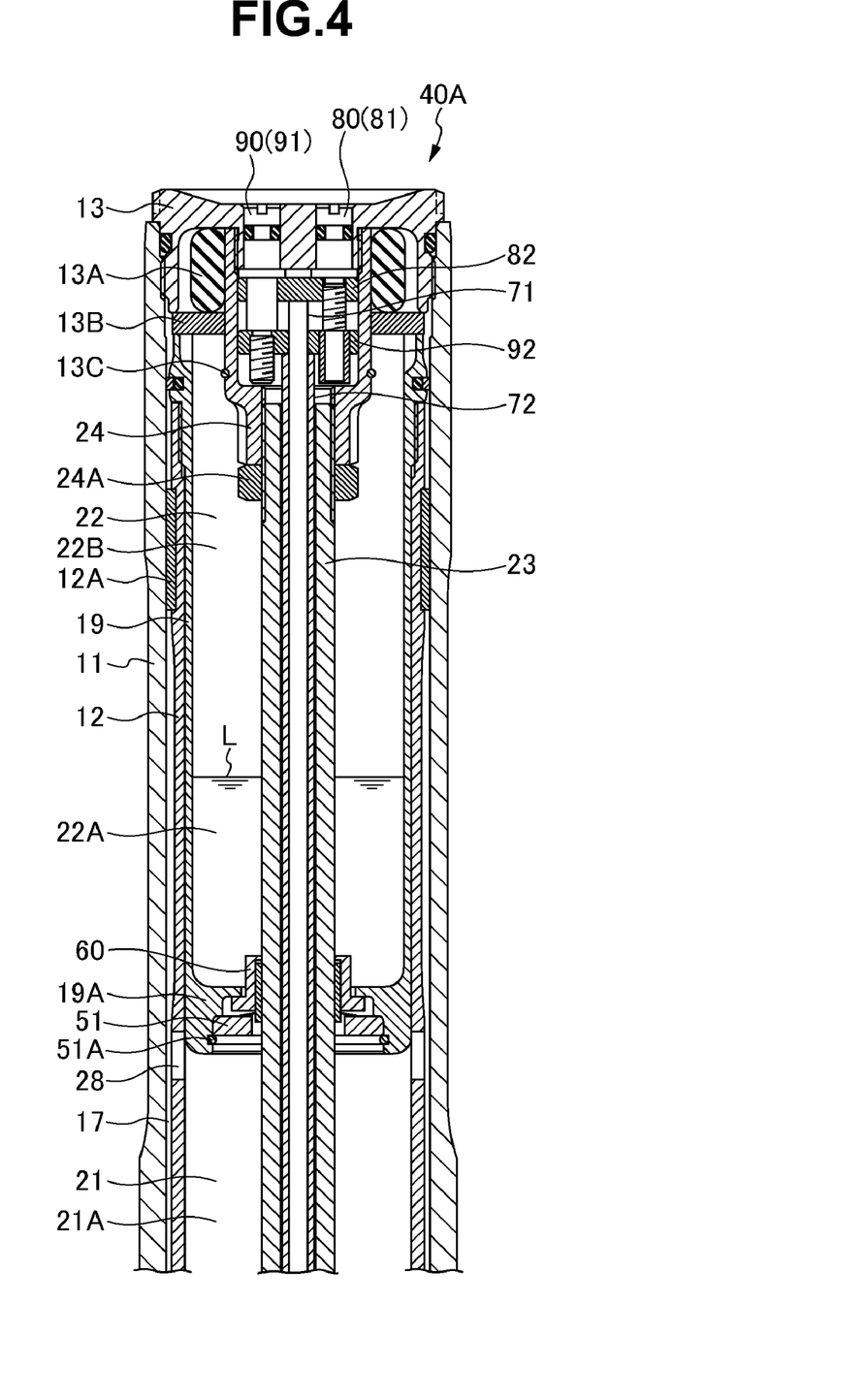
FIG. 4 is a cross sectional view of an upper portion in FIG. 1.
Figure 5:
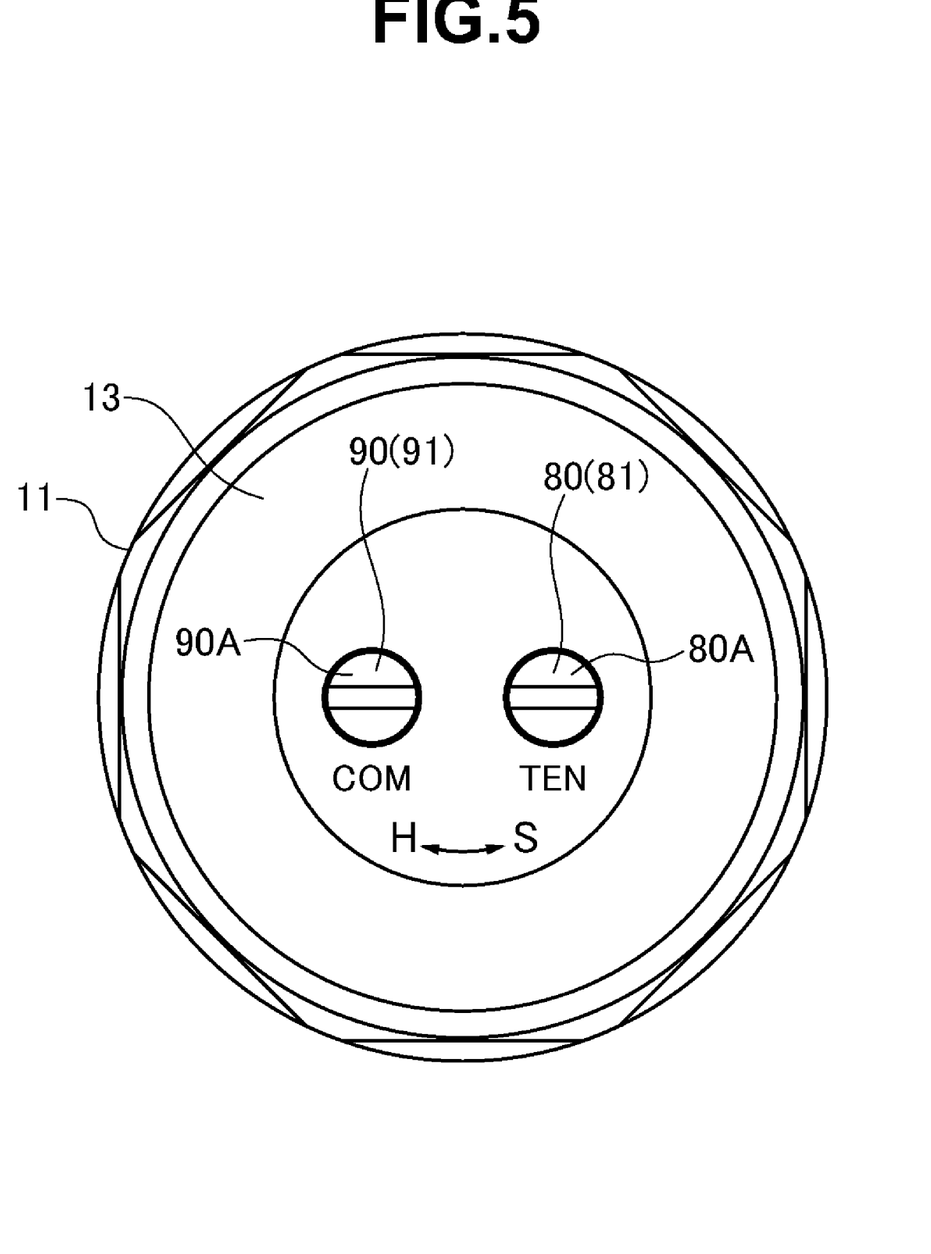
FIG. 5 is a plan view showing a cap.

The front fork 10 is provided with a damping force generating apparatus 40 in the piston 26 (FIGS. 3 and 4).

The damping force generating apparatus 40 is provided with a compression side flow path 41 and an expansion side flow path 42 (not shown). The compression side flow path 41 is opened and closed by a compression side disc valve 41A (a compression side damping valve) backed up by a valve stopper 41B. The expansion side flow path 42 is opened and closed by an expansion side disc valve 42A (an expansion side damping valve) backed up by a valve stopper 42B. In this case, the valve stopper 41B, the valve 41A, the piston 26, the valve 42A and the valve stopper 42B construct a valve assembly inserted and attached to the piston bolt 25, and is sandwiched and fixed by a piston nut 27 screwed to the piston bolt 25.

The damping force generating apparatus 40 is structured such that a damping force adjusting apparatus 40A in detail mentioned below is provided in a center portion of the cap 13, a needle valve 85 of the damping force adjusting apparatus 40A is inserted to a hollow portion of the piston rod 23, and an opening degree of a bypass path 45 provided in the piston rod 23 is adjusted on the basis of an upward and downward motion of the needle valve 85. The bypass path 45 bypasses the piston 26 and communicates the piston rod side oil chamber 21A with the piston side oil chamber 21B.

In a compression side stroke, the damping force generating apparatus 40 generates a compression side damping force in a low speed region on the basis of a passage resistance of the bypass path 45 an opening degree of which is adjusted by the needle valve 85, and generates a compression side damping force in a middle or high speed region on the basis of a deflection deformation of the compression side disc valve 41A. Further, in an expansion side stroke, the damping force generating apparatus 40 generates an expression side damping force in a low speed region on the basis of the passage resistance of the bypass path 45 an opening degree of which is adjusted by the needle valve 85, and generates an expression side damping force in a middle or high speed region on the basis of a deflection deformation of the expression side disc valve 42A. The stretching vibration of the main suspension spring 33 mentioned above is controlled by the compression side damping force and the expansion side damping force.

The front fork 10 is provided with a stopper rubber 13A and a stopper plate 13B with which the upper end portion of the partition wall member 19 provided in the inner tube 12 comes into contact at a maximum compression stroke, in the lower end surface of the cap 13, and controls the maximum compression stroke by the stopper rubber 13A.

The front fork 10 is structured such that a rebound spring 53 is interposed between a spring seat 51 fixed to a lower end surface facing to the piston rod side oil chamber 21A of the partition wall member 19 in an upper end side of the inner tube 12 by using a stopper ring 51A, and a spring seat 52 locked to a stopper ring 52A provided in the piston rod 23. The partition wall member 19 pressurizes the rebound spring 53 with respect to the spring seat 52 at a time of a maximum expansion of the front fork 10, whereby the maximum expansion stroke is controlled.

Accordingly, in the front fork 10, a cross sectional area S1 of the annular oil chamber 17 constituted by the annular gap between the outer tube 11 and the inner tube 12 is formed larger than a cross sectional area (an area surrounded by an outer diameter) of the piston rod 23 (S1>S2).

Further, the rod guide portion 19A of the partition wall member 19 and the spring seat 51 are provided with a check valve 60 which allows the oil to flow from the oil reservoir chamber 22 to the piston rod side oil chamber 21A in the compression side stroke, and inhibits the oil from flowing from the piston rod side oil chamber 21A to the oil reservoir chamber 22 in the expansion side stroke.

Further, since an oil seal is not sealed around the piston rod 23, in the rod guide portion 19A of the partition wall member 19, a small flow path (an orifice) 61 (not shown) communicating the piston rod side oil chamber 21A and the oil reservoir chamber 22 is constructed by a small gap that a bush pressure inserted to an inner periphery of the check valve 60 forms around the piston rod 23. The small flow path 61 may be constituted by an orifice means which is pierced in the rod guide portion 19A of the partition wall member 19, and communicates the piston rod side oil chamber 21A with the oil reservoir chamber 22.

A motion of the front fork 10 is as follows.

(Compression Side Stroke)

The working fluid at an approaching volumetric capacity of the piston rod 23 going into the inner tube 12 in the compression side stroke is transferred to the annular oil chamber 17 from the oil chamber 21A in the inner periphery of the inner tube 12 via the oil hole 28. At this time, since a volumetric increment ΔS1 (a supply amount) of the annular oil chamber 17 is larger than a volumetric increment ΔS2 of the piston rod 23, a deficiency (ΔS1−ΔS2) is supplied from the oil reservoir chamber 22 via the check valve 60, in a necessary supply amount of the oil to the annular oil chamber 17.

In this compression side stroke, as mentioned above, the compression side damping force is generated on the basis of the passage resistance of the bypass path 45 the opening degree of which is adjusted by the needle valve 85, in the low speed region, and the compression side damping force is generated on the basis of the deflection deformation of the compression side disc valve 41A in the middle or high speed region.

(Expansion Side Stroke)

In the expansion side stroke, the working fluid at a leaving volumetric capacity of the piston rod 23 going out of the inner tube 12 in the expansion side stroke is transferred to the oil chamber 21A in the inner periphery of the inner tube 12 from the annular oil chamber 17 via the oil hole 28 of the inner tube 12. At this time, since a volumetric decrement ΔS1 (a discharging amount) of the annular oil chamber 17 is larger than a volumetric decrement ΔS2 of the piston rod 23, a surplus (ΔS1−ΔS2) is discharged to the oil reservoir chamber 22 via the small flow path 61, in the discharging amount of the oil from the annular oil chamber 17.

In this expansion stroke, as mentioned above, the expansion side damping force is generated on the basis of the passage resistance of the bypass path 45 the opening degree of which is adjusted by the needle valve 85, in the low speed region, and the expansion side damping force is generated on the basis of the deflection deformation of the expansion side disc valve 42A in the middle or high speed region. Further, the expansion side damping force is generated by the passage resistance of the small flow path 61 mentioned above.

A description will be given of the damping force adjusting apparatus 40A.

The damping force adjusting apparatus 40A is structured, as shown in FIGS. 3 and 4, such that two coaxially inserted push rods 71 and 72 are inserted to the hollow portion of the piston rod 23 (the push rod 72 is inserted to the hollow portion of the piston rod 23, and the push rod 71 is inserted to the hollow portion of the push rod 72), and a first adjusting portion 80 moving the push rod 71 in an axial direction, and a second adjusting portion 90 moving the push rod 72 in the axial direction are provided in the cap 13 corresponding to the upper portion of the front fork 10.

The first adjusting portion 80 adjusts the damping force generated by the passage resistance of the bypass path 45 by moving the needle valve 85. The second adjusting portion 90 adjusts the damping force generated by the deflection deformation of the compression side disc valve 41A by adjusting a set load of a spring 97 energizing the compression side disc valve 41A in a closing direction. A description will be given below of the structures of the first adjusting portion 80 and the second adjusting portion 90, the damping force adjusting structure using the needle valve 85, and the damping force adjusting structure using the spring 97.

(Structure of First Adjusting Portion 80 and Second Adjusting Portion 90) (FIGS. 5, 6, 8 and 9)

Figure 6:
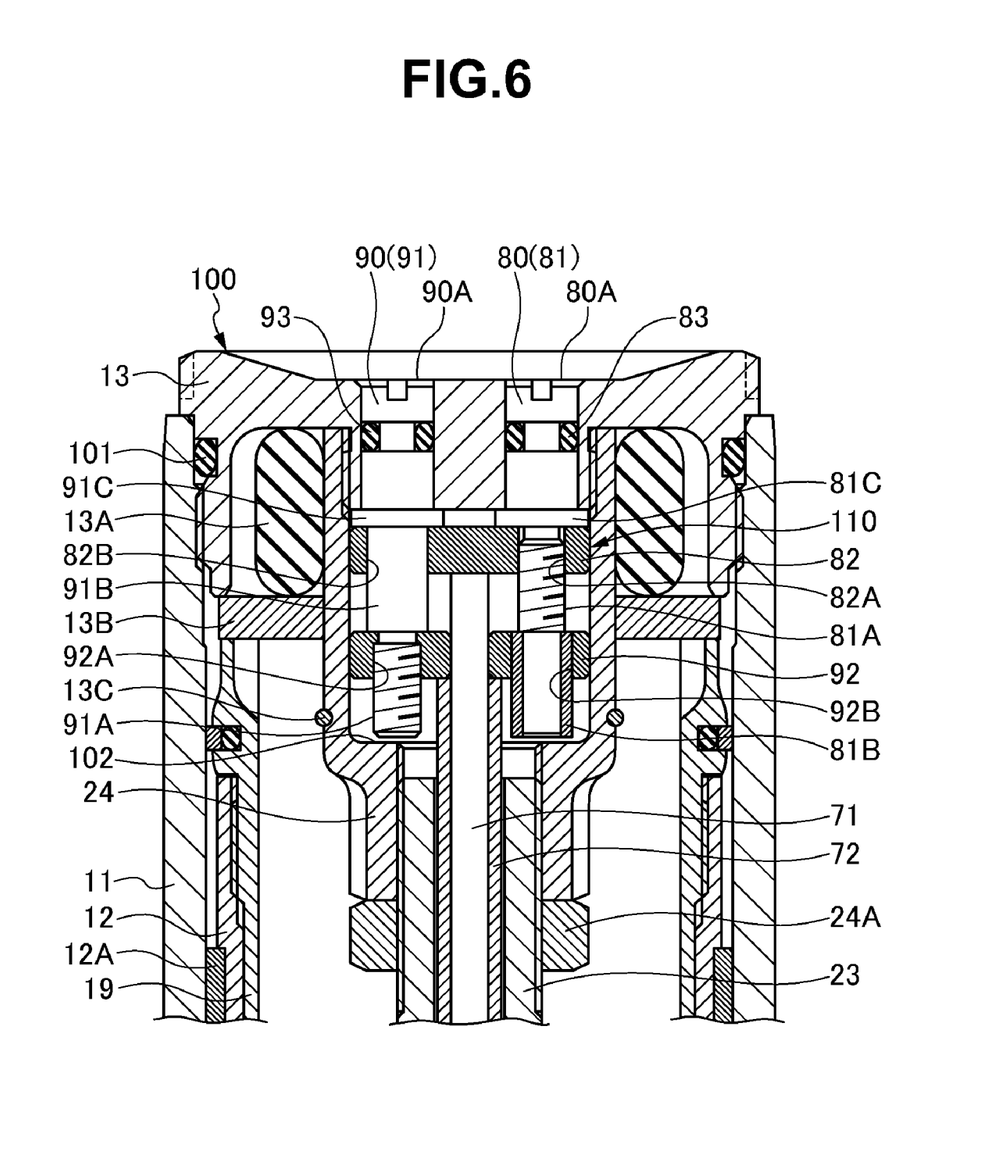
FIG. 6 is a cross sectional view showing an adjusting portion provided in the cap.
Figure 8:
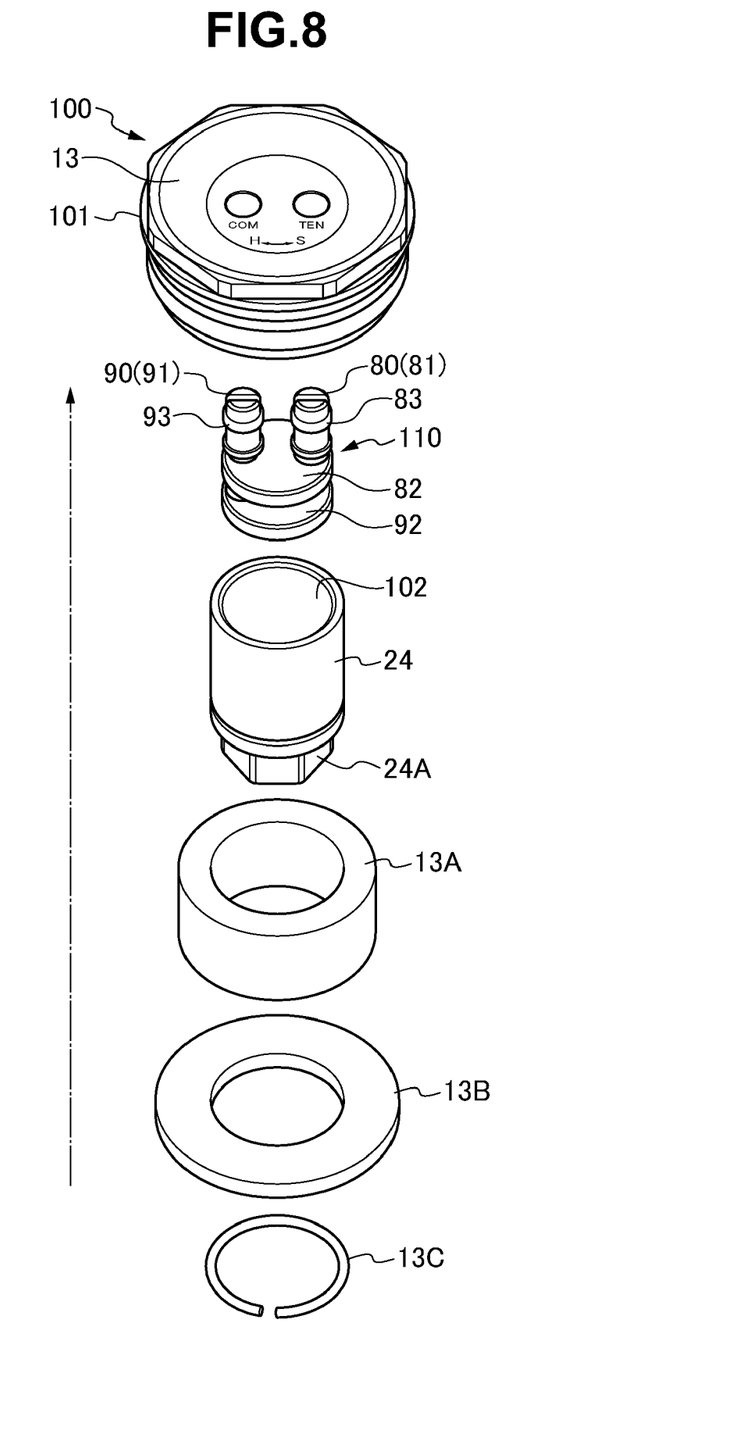
FIG. 8 is a perspective view showing an integrated part of the cap in an exploded manner.

The attaching collar 24 is screwed to the lower end opening side of the cap 13, and a cap assembly 100 is constructed. The cap 13 of the cap assembly 100 is screwed in a liquid tight manner to the upper end opening portion of the outer tube 11 via an O-ring 101, and the upper end portion of the piston rod 23 is screwed to the lower end portion of the attaching collar 24 so as to be fixed by the lock nut 24A. The stopper rubber 13A is loaded to an annular concave portion formed by the cap 13 of the cap assembly 100 and the attaching collar 24, the stopper plate 13B is inserted and attached to the outer periphery of the attaching collar 24, and the stopper ring 13C locking the stopper plate 13B is locked and attached (FIGS. 6 and 8).

Figure 9:
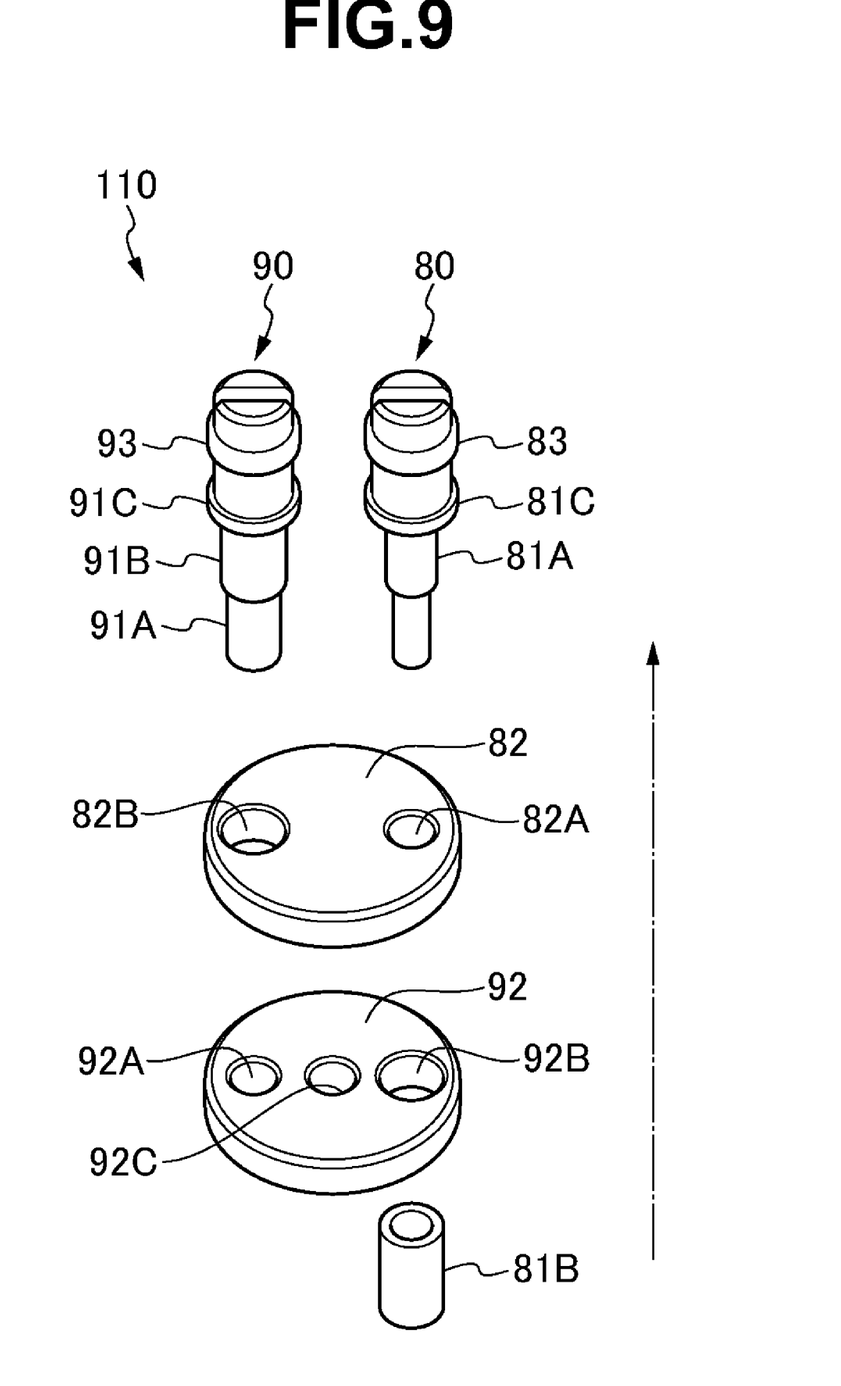
FIG. 9 is a perspective view showing an adjust bolt and an adjust nut in an exploded manner.

An adjust assembly 110 is loaded to the cap 13 of the cap assembly 100 and the attaching collar 24. The adjust assembly 110 is structured, as shown in FIG. 9, such that the first adjusting portion 80 is constituted by a first adjust bolt 81, the second adjusting portion 90 is constituted by a second adjust bolt 91, and first and second adjust nuts 82 and 92 are provided in correspondence to the respective adjust bolts 81 and 91. The first adjust nut 82 is provided with a thread hole 82A with which a thread portion 81A of the corresponding first adjust bolt 81 is engaged, and a guide hole 82B to which a guide portion 91B of the other adjust bolt 91 is inserted. The second adjust nut 92 is provided with a thread hole 92A with which a thread portion 91A of the corresponding second adjust bolt 91 is engaged, and a guide hole 92B to which a guide collar 81B fitted to the other adjust bolt 81 is inserted. Accordingly, on the basis of a rotational operation of the first adjust bolt 81, the first adjust nut 82 with which the adjust bolt 81 is engaged is prevented from rotating and is guided so as to be moved in the axial direction, via an engagement between the guide hole 82B of the adjust nut 82 and the guide portion 91B of the other adjust bolt 91, thereby being moved up and down in the axial direction. On the other hand, on the basis of a rotational operation of the second adjust bolt 91, the second adjust nut 92 with which the adjust bolt 91 is engaged is prevented from rotating and is guided so as to be moved in the axial direction, via an engagement between the guide hole 92B of the adjust nut 92 and the guide portion 81B of the other adjust bolt 81, thereby being moved up and down in the axial direction.

The first adjust bolt 81 of the first adjusting portion 80 and the second adjust bolt 91 of the second adjusting portion 90 constructing the adjust assembly 110 are respectively inserted and attached in a liquid tight manner to two loading holes which are arranged side by side at positions deviating from the center of the cap 13 in a plan view of the cap 13 constructing the cap assembly 100, via the O-rings 83 and 93 from the back surface side of the cap 13. Further, the first adjust bolt 81 and the second adjust bolt 91 are stored in a center concave portion 102 of the cap assembly 100 formed by a screw attachment of the attaching collar 24 to the cap 13, together with the adjust nuts 82 and 92, flange portions 81C and 91C of the adjust bolts 81 and 91 are brought into contact with the lower surface of the cap 13, and lower end surfaces of the adjust bolts 81 and 91 come close to a bottom surface of the center concave portion 102 formed by the attaching collar 24. The adjust nuts 82 and 92 are stored so as to come into slidable contact with an inner periphery of the center concave portion 102 formed by the attaching collar 24. The push rod 71 protruding from the hollow portions of the piston rod 23 and the push rod 72 are brought into contact with the lower end surface of the first adjust nut 82 through the center hole 92C of the second adjust nut 92, and the push rod 72 protruding from the hollow portion of the piston rod 23 is brought into contact with the lower end surface around the center hole 92C of the second adjust nut 92.

Accordingly, an upper end operation portion 80A of the first adjust bolt 81 of the first adjusting portion 80, and an upper end operation portion 90A of the second adjust bolt 91 of the second adjusting portion 90 is arranged side by side in a level forming the same surface as the upper surface of the cap 13 at a position which is deviated from the center of the cap 13, in a plan view of the cap 13 constructing the cap assembly 100. Further, the first adjust bolt 81 of the first adjusting portion 80 is pivoted to the cap 13 in such a manner as to rotate only without moving in the axial direction, and the second adjust bolt 91 of the second adjusting portion 90 is pivoted to the cap 13 in such a manner as to rotate only without moving in the axial direction. Accordingly, if the first adjust bolt 81 of the first adjusting portion 80 is rotationally operated, the first adjust nut 82 with which the first adjust bolt 81 is engaged is moved up and down in the axial direction, and it is possible to move the push rod 71 into contact with the first adjust nut 82 in the axial direction. On the other hand, if the second adjust bolt 91 of the second adjusting portion 90 is rotationally operated, the second adjust nut 92 with which the second adjust bolt 91 is engaged is moved up and down in the axial direction, and it is possible to move the push rod 72 into contact with the second adjust nut 92 in the axial direction.

(Damping Force Adjusting Structure Using Needle Valve 85) (FIG. 3)

An inner base 84 is inserted and attached to the lower end portion of the hollow portion of the piston rod 23, and the lower end surface of the piston rod 23 and an inner diameter step portion of the piston bolt 25 sandwiches and fixes the lower end flange of the inner base 84. The inner base 84 may be pressure inserted to the hollow portion of the piston rod 23. The needle valve 85 is inserted in a liquid tight manner to an inner periphery of the inner base 84 fixed to the piston rod 23 as mentioned above, and a spring 86 interposed between an intermediate flange portion 85A of the needle valve 85 and an upper end surface of the inner base 84 energizes the needle valve 85 to an upper side (a valve opening direction) in the axial direction, and brings the upper end surface of the needle valve 85 into contact with the lower end surface of the push rod 71.

If the first adjust bolt 81 of the first adjusting portion 80 moves the push rod 71 up and down in the axial direction as mentioned above, the needle valve 85 coming into contact with the bush rod 71 in the axial direction is moved up and down with respect to the piston bolt 25, goes into and out of the valve seat of the vertical hole upper end portion of the bypass path 45 provided in the piston bolt 25, adjusts the opening degree of the bypass path 45, and can adjust the damping forces in the compression side and the expansion side caused by the passage resistance of the bypass path 45 by extension.

Figure 7:
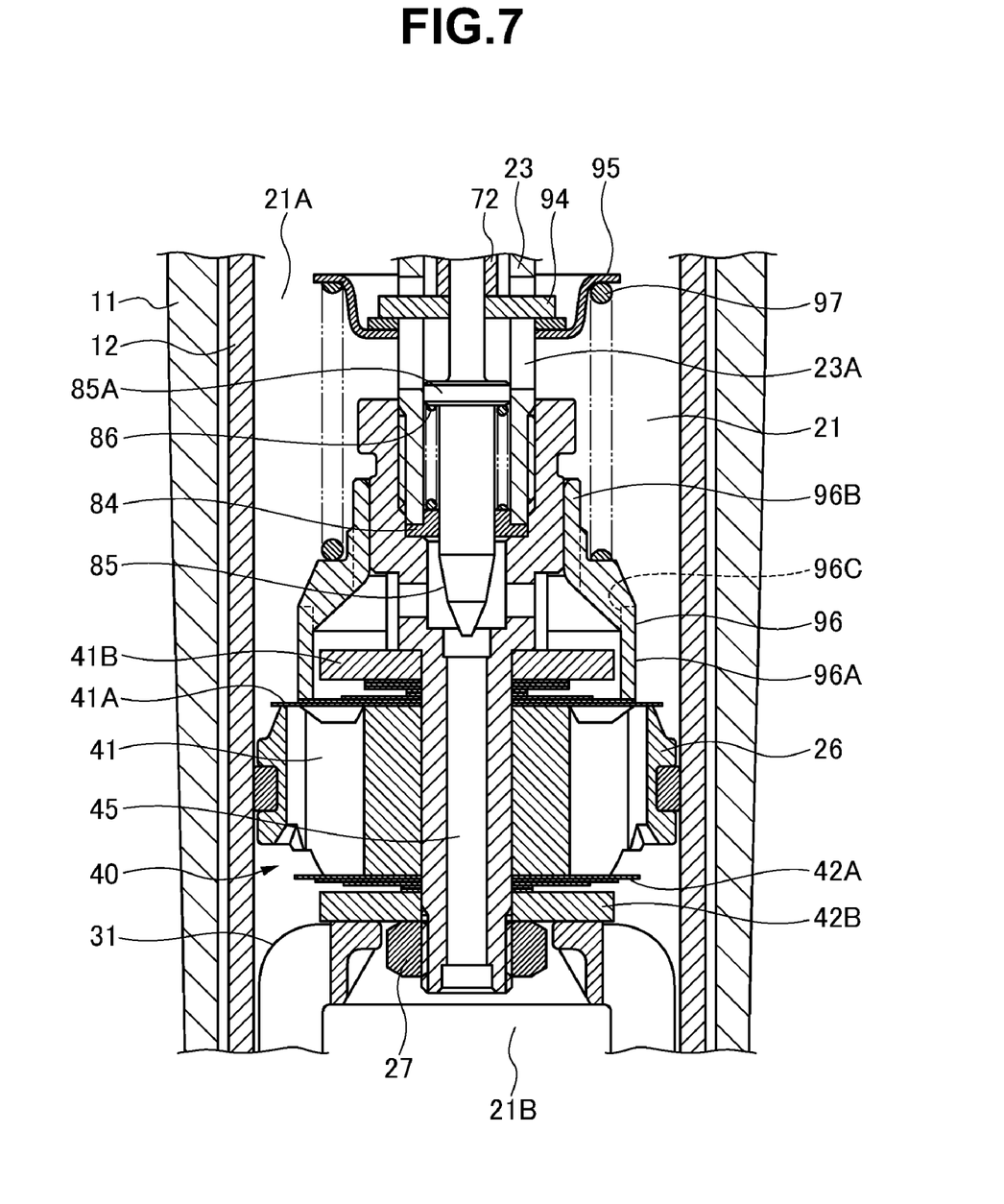
FIG. 7 is a cross sectional view showing a damping force adjusting structure.

(Damping Force Adjusting Structure Using Spring 97) (FIGS. 3 and 7)

A guide hole 23A extending in the axial direction and having a long hole shape is provided in both sides in a diametrical direction in the lower end side of the piston rod 23, and both side projections of a pressing piece 94 are locked into the guide holes 23A so as to be slidable in the axial direction approximately without any play. The lower end surface of the push rod 72 inserted to the hollow portion of the piston rod 23 comes into direct contact with an upper surface of the pressing piece 94, and a cross sectional portion of the needle valve 85 loosely inserted to the lower end portion of the push rod 72 is loosely inserted to a circular hole provided in a center of the pressing piece 94 so as to be slidable in the axial direction.

A spring receiver 95 coming into contact with both end projections of the pressing piece 94 from a lower side and a valve holder 96 coming into contact with an upper surface (a back surface) of the compression side disc valve 41A are arranged around a lower end portion (the piston bolt 25) of the piston rod 23, and a valve holder spring 97 is interposed between the spring receiver 95 and the valve holder 96. The spring receiver 95, formed as a cup shape, comes into contact with both side projections of the pressing piece 94 in an inner peripheral lower end of the cup, and form a spring 97 seat on an upper end outer peripheral flange of the cup. The valve holder 96 is provided with an annular holding portion 96A coming into contact with an appropriate outer diametrical position of the upper surface of the compression side disc valve 41A continuously (or intermittently) around a whole periphery, a slide portion 96B slid and guided to an upper end outer periphery of the piston bolt 25, and an oil path 96C communicating the piston rod side oil chamber 21A with the compression side flow path 41, the expansion side flow path 42 and the bypass path 45, and makes the spring 97 seat on the outer peripheral step portion.

If the adjust bolt 91 of the second adjusting portion 90 moves the push rod 72 in the axial direction as mentioned above, the pressing piece 94 with which the lower end surface of the push rod 72 comes into slidable contact moves the spring receiver 95 up and down so as to expand and compress the valve holder spring 97, and adjusts a set load of the spring 97. Accordingly, the set load of the spring 97 energizes in a direction of closing the compression side disc valve 41A via the valve holder 96, and can adjust the compression side damping force caused by the deflection deformation of the compression side disc valve 41A. The valve holder 96 can be replaced by a structure having a different diameter of the holding portion 96A, and the valve holder 96 provided with the large-diameter holding portion 96A holds the outer peripheral side of the compression side disc valve 41A, and enlarges the damping force from the low speed region of the piston speed. The valve holder 96 provided with the small-diameter holding portion 96A holds the inner peripheral side of the compression side disc valve 41A and enlarges the damping force in the middle to high speed region of the piston speed.

Therefore, in accordance with the present embodiment, the following operations and effects can be achieved.

(a) Since a plurality of adjusting portions 80 and 90 are arranged side by side in the plan view of the cap 13, it is possible to restrict the height and provide a streamlined outer appearance.

(b) Since each of a plurality of adjusting portions 80 and 90 is arranged at the position which is deviated from the center of the cap 13 in the plan view of the cap 13, it is possible to compactly arrange a plurality of adjusting portions 80 and 90 within a limited diameter range of the cap 13.

(c) Since each of a plurality of adjusting portions 80 and 90 is pivoted to the cap 13 so as to rotate without moving in the axial direction, each of the adjusting portions 80 and 90 is not moved upward on the basis of the rotating operation, and it is possible to restrict the height.

(d) A plurality of adjusting portions 80 and 90 are respectively constituted by the adjust bolts 81 and 91, and accessorily have a plurality of adjust nuts 82 and 92 corresponding to the adjust bolts 81 and 91, and the adjust nuts 82 and 92 are respectively provided with the thread holes 82A and 92A with which the corresponding adjust bolts 81 and 91 are engaged, and the guide holes 82B and 92B to which the other adjust bolts 81 and 91 are inserted. Accordingly, when the adjust bolts 81 and 91 move the corresponding adjust nuts 82 and 92, it is possible to prevent the adjust nuts 82 and 92 from rotating and guide so as to move in the axial direction, by utilizing the other adjust nuts 82 and 92. A rotation preventing part and a guide part for the adjust nuts 82 and 92 are not independently necessary.

As heretofore explained, embodiments of the present invention have been described in detail with reference to the drawings. However, the specific configurations of the present invention are not limited to the embodiments but those having a modification of the design within the range of the present invention are also included in the present invention. The present invention can be widely applied to a general hydraulic shock absorber.

Further, in accordance with the present invention, in the case that the cap is provided with three or more adjusting portions, for example, three adjusting portions such as a set load adjusting portion of a spring energizing a damping valve, an opening degree adjusting portion of a needle valve for a low piston speed, and an opening degree adjusting portion of a needle valve for a high piston speed, these adjusting portions may be arranged side by side.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A hydraulic shock absorber comprising:
an axle side inner tube slidably inserted to a vehicle body side outer tube;
a partition wall member provided in an inner periphery of said inner tube, and a working fluid chamber and an oil reservoir chamber respectively comparted in a lower side and an upper side of said partition wall member; a hollow piston rod attached to said outer tube side inserted into said working fluid chamber through said partition wall member, and a piston sliding within said working fluid chamber provided in a leading end portion of said piston rod;
the working fluid chamber of said inner tube comparted into a piston rod side oil chamber and a piston side oil chamber by the piston, the two oil chambers capable of being communicated by a compression side flow path and an expansion side flow path provided in the piston, and a compression side damping valve and an expansion side damping valve being respectively provided in outlets of the two flow paths;
a hollow portion of the piston rod provided with a bypass path communicating a piston rod side oil chamber with a piston side oil chamber, and said bypass path provided with a needle valve; and
a cap sealed to an upper end opening portion of said outer tube provided with a first adjusting portion moving the needle valve and adjusting a damping force caused by a passage resistance of the bypass path, and a second adjusting portion adjusting a deflection deformation of a compression side damping valve by adjusting a set load of a spring energizing the compression side damping valve in a closing direction,
wherein the first and second adjusting portions are arranged side by side in a plan view of said cap; and each of said first and second adjusting portions is arranged at a position which is deviated from a center of said cap, in the plan view of said cap.

2. A hydraulic shock absorber according to claim 1, wherein each of said plurality of adjusting portions is pivoted to said cap in such a manner as to rotate without moving in the axial direction.

3. A hydraulic shock absorber structured such that a vehicle body side tube and an axle side tube are slidably fitted, and a plurality of adjusting portions are provided in a cap sealed to an upper end opening portion of said vehicle body side tube,
wherein said plurality of adjusting portions are arranged side by side in a plan view of said cap; and each of said plurality of adjusting portions is arranged at a position which is deviated from a center of said cap, in the plan view of said cap;
wherein each of said plurality of adjusting portions is pivoted to said cap in such a manner as to rotate without moving in the axial direction;
wherein said plurality of adjusting portions are constituted by adjust bolts, and accessorily have a plurality of adjust nuts corresponding to the adjust bolts,
wherein each of the adjust nuts is provided with a thread hole with which the corresponding adjust bolt is engaged, and a guide hole to which the other adjust bolt is inserted, and
wherein the adjust nut engaged with the adjust bolt is prevented from rotating and is guided so as to move in an axial direction via an engagement between the guide hole of said adjust nut and the other adjust bolt, thereby being movable in the axial direction, on the basis of the rotational operation of each of the adjust bolts.

4. A hydraulic shock absorber comprising:
an axle side inner tube slidably inserted to a vehicle body side outer tube;
a partition wall member provided in an inner periphery of said inner tube, and a working fluid chamber and an oil reservoir chamber respectively comparted in a lower side and an upper side of said partition wall member;
a piston support member attached to said outer tube side inserted into said working fluid chamber through said partition wall member, and a piston sliding within said working fluid chamber provided in a leading end portion of said piston support member; and
a plurality of adjusting portions provided in a cap sealed to an upper end opening portion of said outer tube,
wherein said plurality of adjusting portions are arranged side by side in a plan view of said cap; and each of said plurality of adjusting portions is arranged at a position which is deviated from a center of said cap, in the plan view of said cap;
wherein each of said plurality of adjusting portions is pivoted to said cap in such a manner as to rotate without moving in the axial direction;

wherein said plurality of adjusting portions are constituted by adjust bolts, and accessorily have a plurality of adjust nuts corresponding to the adjust bolts, wherein each of the adjust nuts is provided with a thread hole with which the corresponding adjust bolt is engaged, and a guide hole to which the other adjust bolt is inserted, and wherein the adjust nut engaged with the adjust bolt is prevented from rotating and is guided so as to move in an axial direction via an engagement between the guide hole of said adjust nut and the other adjust bolt, thereby being movable in the axial direction, on the basis of the rotational operation of each of the adjust bolts.

5. A hydraulic shock absorber comprising:

an axle side inner tube slidably inserted to a vehicle body side outer tube;

a partition wall member provided in an inner periphery of said inner tube, and a working fluid chamber and an oil reservoir chamber respectively comparted in a lower side and an upper side of said partition wall member;

a hollow piston rod attached to said outer tube side inserted into said working fluid chamber through said partition wall member, and a piston sliding within said working fluid chamber provided in a leading end portion of said piston rod;

a working fluid chamber of said inner tube comparted into a piston rod side oil chamber and a piston side oil chamber by the piston, the two oil chambers capable of being communicated by a compression side flow path and an expansion side flow path provided in the piston, and a compression side damping valve and an expansion side damping valve being respectively provided in outlets of the two flow paths;

a hollow portion of the piston rod provided with a bypass path communicating a piston rod side oil chamber with a piston side oil chamber, and said bypass path provided with a needle valve; and a cap sealed to an upper end opening portion of said outer tube provided with a first adjusting portion moving the needle valve and adjusting a damping force caused by a passage resistance of the bypass path, and a second adjusting portion adjusting a deflection deformation of a compression side damping valve by adjusting a set load of a spring energizing the compression side damping valve in a closing direction;

wherein the first and second adjusting portions are arranged side by side in a plan view of said cap; and each of said first and second adjusting portions is arranged at a position which is deviated from a center of said cap, in the plan view of said cap;

wherein each of said plurality of adjusting portions is pivoted to said cap in such a manner as to rotate without moving in the axial direction;

wherein said plurality of adjusting portions are constituted by adjust bolts, and accessorily have a plurality of adjust nuts corresponding to the adjust bolts, wherein each of the adjust nuts is provided with a thread hole with which the corresponding adjust bolt is engaged, and a guide hole to which the other adjust bolt is inserted, and wherein the adjust nut engaged with the adjust bolt is prevented from rotating and is guided so as to move in an axial direction via an engagement between the guide hole of said adjust nut and the other adjust bolt, thereby being movable in the axial direction, on the basis of the rotational operation of each of the adjust bolts.

6. A hydraulic shock absorber comprising:

an axle side inner tube slidably inserted to a vehicle body side outer tube;

a partition wall member provided in an inner periphery of said inner tube, and a working fluid chamber and an oil reservoir chamber respectively comparted in a lower side and an upper side of said partition wall member;

a hollow piston rod attached to said outer tube side inserted into said working fluid chamber through said partition wall member, and a piston sliding within said working fluid chamber provided in a leading end portion of said piston rod;

a working fluid chamber of said inner tube comparted into a piston rod side oil chamber and a piston side oil chamber by the piston, the two oil chambers capable of being communicated by a compression side flow path and an expansion side flow path provided in the piston, and a compression side damping valve and an expansion side damping valve being respectively provided in outlets of the two flow paths;

a hollow portion of the piston rod provided with a bypass path communicating a piston rod side oil chamber with a piston side oil chamber, and said bypass path provided with a needle valve; and a cap sealed to an upper end opening portion of said outer tube provided with a first adjusting portion moving the needle valve and adjusting a damping force caused by a passage resistance of the bypass path, and a second adjusting portion adjusting a deflection deformation of a compression side damping valve by adjusting a set load of a spring energizing the compression side damping valve in a closing direction, wherein the first and second adjusting portions are arranged side by side in a plan view of said cap; and each of said first and second adjusting portions is arranged at a position which is deviated from a center of said cap, in the plan view of said cap;

wherein a cap assembly is constructed by screwing an attaching collar to a lower end opening side of said cap, the cap of said cap assembly screwed to an upper end opening portion of said outer tube, and an upper end portion of said piston rod screwed and fixed to a lower end portion of said attaching collar, wherein an adjust assembly is loaded to the cap of said cap assembly and the attaching collar, and said adjust assembly constructs said first adjusting portion by a first adjust bolt and constructs said second adjusting portion by a second adjust bolt, and has first and second adjust nuts corresponding to the respective adjust bolts, wherein each of the adjust nuts is provided with a thread hole with which the corresponding adjust bolt is engaged, and a guide hole to which the other adjust bolt is inserted, and wherein the adjust nut engaged with the adjust bolt is prevented from rotating and is guided so as to move in an axial direction via an engagement between the guide hole of said adjust nut and the other adjust bolt, thereby being movable in the axial direction, on the basis of the rotational operation of each of the adjust bolts.

* * * * *